L. JOURDAN AND A. TRÉMAUX.
NUT FASTENER.
APPLICATION FILED DEC. 27, 1919.
1,386,259.
Patented Aug. 2, 1921.
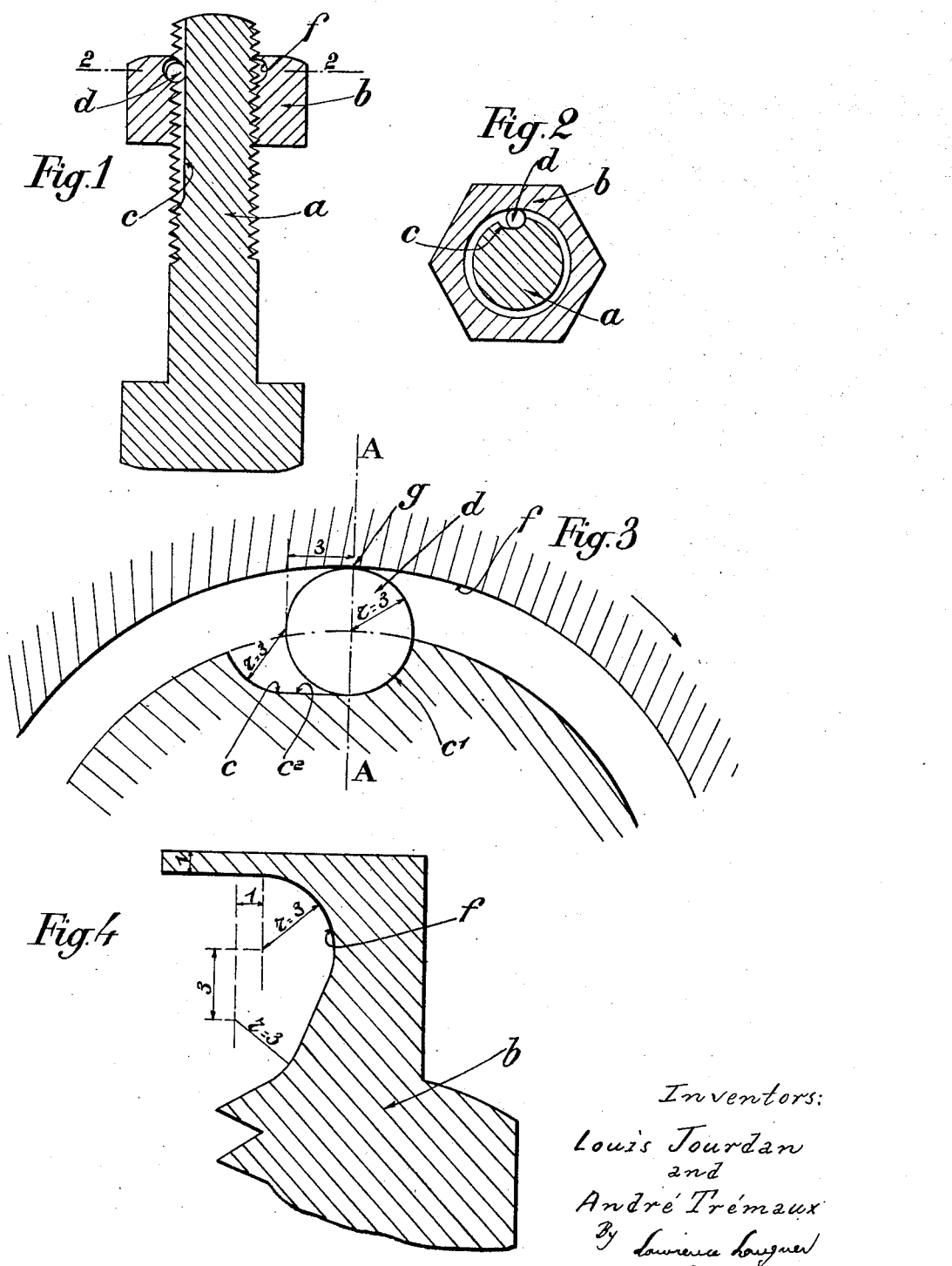
Inventors:
Louis Jourdan
and
André Trémaux
By Lawrence Langner
Attorney.

UNITED STATES PATENT OFFICE.

LOUIS JOURDAN AND ANDRÉ TRÉMAUX, OF ST. ETIENNE, FRANCE.

NUT-FASTENER.

1,386,259. Specification of Letters Patent. Patented Aug. 2, 1921.

Application filed December 27, 1919. Serial No. 347,720.

*To all whom it may concern:*

Be it known that we, LOUIS JOURDAN and ANDRÉ TRÉMAUX, citizens of the Republic of France, residing, respectively, at 2 Rue de la Bourse, St. Étienne, Loire, in the Republic of France, and 35 Rue Balaÿ, St. Étienne, Loire, in the Republic of France, have invented new and useful Improvements in Nut-Fasteners, of which the following is a specification.

This invention relates to a device by means of which the unscrewing of a nut is automatically prevented though it may be rendered possible very easily, this device having the advantage of being of a very simple and very cheap construction and applicable without any difficulty to all sizes of bolts or nuts.

According to the invention, the bolt or screw-threaded stem on which the nut is screwed is provided with a longitudinal slot in which is placed a ball which is besides retained in an inner groove provided in the nut, the surface of this slot ending on one side by a cylindrical part which conforms to the spherical surface of the ball when the latter is in contact with the surface of the nut groove, said surface of slot comprising besides a flat part merging into the aforesaid cylindrical part and extending at right angles to the diametrical plane passing through the point of contact of the ball with the nut.

In the accompanying drawing given by way of an example:

Figure 1 is a longitudinal section of a screwbolt carrying a nut which is provided with a locking device designed in accordance with the invention.

Fig. 2 is a cross-section on line 2—2 of Fig. 1.

Fig. 3 is a fragmentary cross-section at an enlarged scale showing the transversal profile of the bolt slot.

Fig. 4 is a fragmentary longitudinal section, also at an enlarged scale, showing the sectional profile of the nut groove.

As shown, the bolt $a$ on which is screwed the nut $b$ is provided with a longitudinal slot $c$ in which may roll transversally a ball $d$ retained in a circular groove $f$ provided in the screw-threaded part of the nut, the shape of said groove being somewhat like that of a torus and its radius in cross section being preferably equal to the radius of the ball, as shown in Fig. 4.

The surface of slot $c$ comprises a cylindrical part $c^1$ having a radius equal to that of the ball and against which the ball may be brought while remaining in contact at $g$ with the surface of the groove $f$ of the nut. The slot $c$ comprises also a flat part $c^2$ merging into said cylindrical part $c^1$ and at right angles with the bolt diameter A—A passing through the point of contact $g$.

It will be readily understood that when the nut is screwed by rotating the same in the direction of the arrow in Fig. 3, the ball $d$ engaging the nut contacts with the cylindrical surface $c^1$ so that the nut may be readily rotated in said direction around the bolt in the manner of a free wheel. If it be attempted to unscrew the nut, the ball $d$ is carried along in an opposite direction to that of the arrow for an exceedingly small distance and will immediately be jammed between the inner surface of the groove $f$ and the flat part $c^2$ of the slot $c$ so that unscrewing is impossible. However, by inserting any more or less tapered stem or nail through the upper end of the slot $c$ (Fig. 1) in such a manner as to push back the ball against the surface $c^1$, it will be possible to unscrew the nut without any difficulty.

Having now described our invention, what we claim as new and desire to secure by Letters Patent is:

A locking device for preventing the unscrewing of screws and nuts comprising the combination of a nut having in its screw-threaded surface, an uninterrupted annular groove of a substantially rounded cross section concentric with the screw-threaded surface, a bolt having a longitudinal groove in its screw-threaded surface and a ball adapted to be retained at the intersection of both grooves, said longitudinal groove comprising two opposite cylindrical parts having substantially the same radius as the ball and a flat part tangent to both said cylindrical parts and substantially at right angles to a radial plane passing through the point of contact of the ball with the nut when said ball is in contact with said cylindrical part.

In testimony whereof we have signed our names to this specification in the presence of two subscribing witnesses.

LOUIS JOURDAN.
ANDRÉ TRÉMAUX.

Witnesses:
BAVILOT GASPEVU,
I. ENZILLERD.